J. W. FINCH AND W. A. TALLEY.
ATTACHMENT FOR STRAIGHT AIR BRAKE VALVES.
APPLICATION FILED JUNE 27, 1921.
1,418,434.
Patented June 6, 1922.
2 SHEETS—SHEET 1.
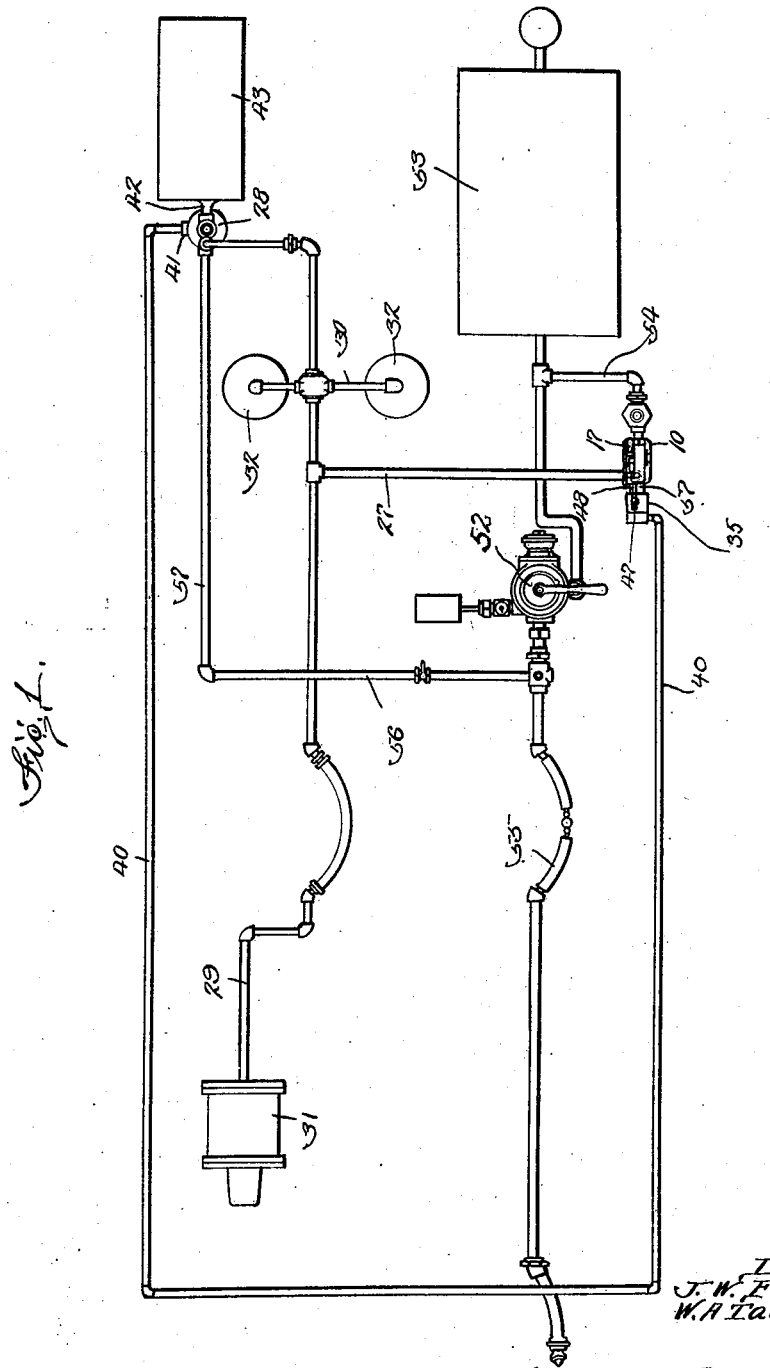

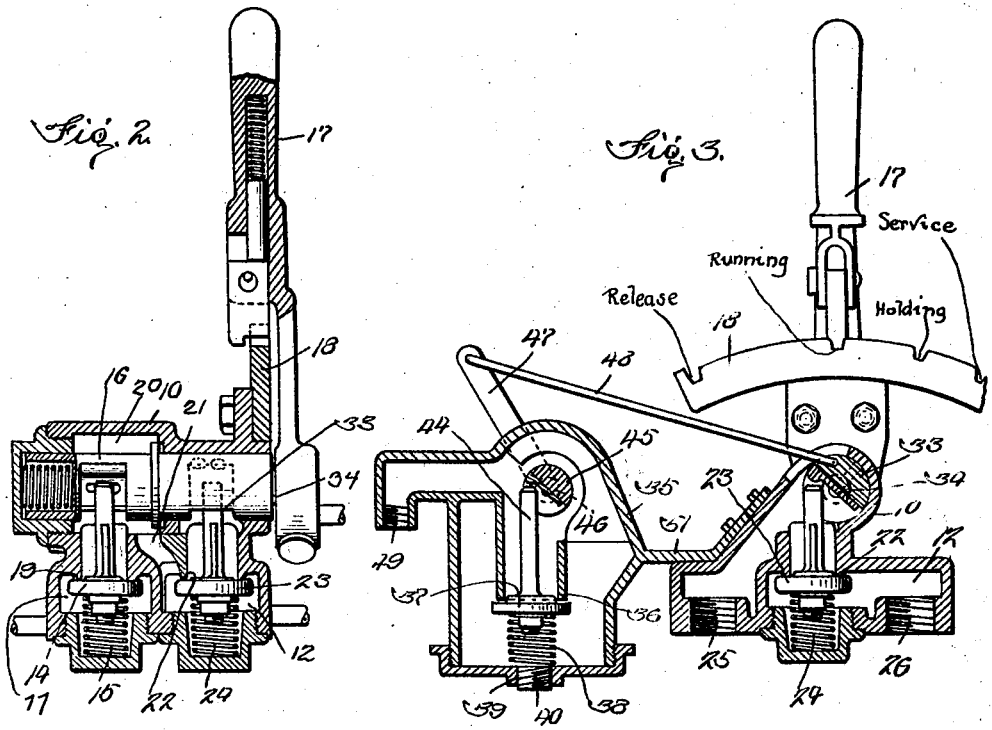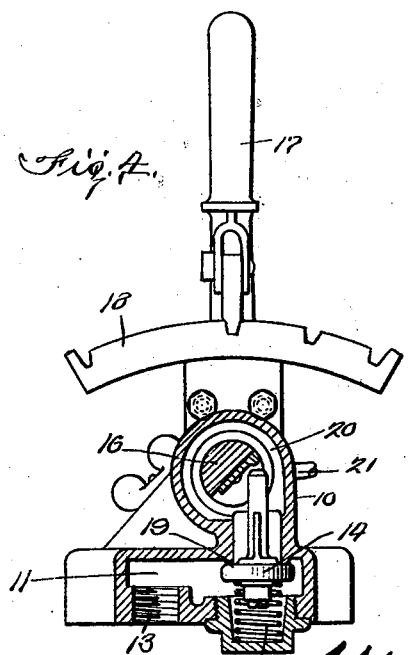

UNITED STATES PATENT OFFICE.

JOHN W. FINCH, OF EL RENO, AND WILLIAM A. TALLEY, OF SHAWNEE, OKLAHOMA.

ATTACHMENT FOR STRAIGHT-AIR BRAKE VALVES.

1,418,434.   Specification of Letters Patent.   Patented June 6, 1922.

Application filed June 27, 1921. Serial No. 480,655.

*To all whom it may concern:*

Be it known that we, JOHN W. FINCH and WILLIAM A. TALLEY, citizens of the United States, residing at El Reno and Shawnee, respectively, in the counties of Canadian and Pottawatomie, respectively, and State of Oklahoma, have invented certain new and useful Improvements in Attachments for Straight-Air Brake Valves, of which the following is a specification, reference being had to the accompanying drawings.

This invention relates to air brakes of the Westinghouse or New York air brake systems, and particularly to an attachment to be applied to the straight-air brake valve and containing an exhaust valve operatively associated with and supplemental to the exhaust valve of the regular straight-air brake.

One object of the invention is to provide means whereby the brakes on engine and tender may be held after making a service application with the automatic brake.

A further object is to provide an attachment which will give much quicker release of the driver and tender brakes than is possible with the present straight-air brake valve and which does away with the usual double check valves and eliminates one triple valve and one auxiliary reservoir on the tender so that one triple valve will control the three brake cylinders.

Another object is to provide means whereby the straight-air brake valve can be operated independently of the automatic brake valve and whereby the automatic brake valve can be operated independently of the straight-air brake valve.

Other objects will appear in the course of the following description.

Our invention is illustrated in the accompanying drawings, wherein:—

Figure 1 is a diagrammatic view of the brake system of an engine and tender showing our invention applied thereto;

Figure 2 is a longitudinal sectional view of the ordinary engineer's brake valve;

Figure 3 is a sectional view of the application valve section of the engineer's brake valve showing in section our attachment applied thereto;

Figure 4 is a transverse sectional view of the inlet section of the usual engineer's brake valve.

In these drawings, we have illustrated diagrammatically the general arrangement of brake cylinders, triple valves, main reservoir, auxiliary reservoir, and the straight-air brake valve for the Westinghouse system of air brakes of the locomotive and tender, and it is to be understood that all the mechanism is that ordinarily found in this system with the exception of a slight modification of the straight-air brake valve which is necessary for use with our attachment.

The brake valve itself is of practically the construction used in the Westinghouse system, and comprises the usual valve casing 10 which is divided to form two chambers 11 and 12, the chamber 11 being connected to the main reservoir by a port 13 and having within it the usual spring-actuated valve 14 normally closed by the spring 15 but adapted to be opened by the oscillatable segment 16 which is operatively connected to the handle 17 of the brake valve, this handle operating over the usual notched sector 18. When the valve 14 is depressed, the air from the main reservoir passes into the chamber 11, passes upward past the valve seat 19 into the upper portion of the cavity 20, from which it passes by a duct 21 into the chamber 12 below the valve 23. The chamber 12 is formed with the usual valve seat 22 against which the valve 23 is held by the spring 24. An exhaust port 25 opens into the upper portion of the casing above the valve 23, while the casing below the valve 23 is provided with the port 26, which port is connected by a brake pipe 27 to the usual triple valve 28 and by the branch pipes 29 and 30 disposed between pipe 27 and the triple valve 28 to the tender brake cylinder 31 and to the driver brake cylinders 32. The valve 23 has the usual stem engaged by the usual segment 33 mounted upon the stem shaft 34 upon which the segment 16 is mounted, the segments 16 and 33 being reversed with relation to each other.

The operation of this valve so far as described is well known in the art. When the handle 17 is in its running position, both valves 14 and 23 are held closed by the respective springs. When the handle 17 is turned to its application or service position, however, the application valve 14 is opened, thus admitting air from the main reservoir into the lower portion of the chamber 12 below the valve 23, and thus by the port 26 the air will flow to the brake pipe 27 and the several cylinders and thus the brakes on the driver and tender will be applied. When, however, the handle 17 is shifted to its release position, the valve 14 will be closed by its spring, thus cutting off the supply of air from the main reservoir and the valve 23 will be opened, thus establishing communication between the exhaust port 25 and the brake pipe 27, thus permitting the relief of the air pressure within the cylinders.

Our attachment comprises a valve casing 35 having a valve seat 36 coacting with a valve 37 which is normally urged upward against the valve seat by means of a spring 38. The valve casing at its lower end has a port 39 which is connected by means of a pipe 40 with the exhaust port 41 of the triple valve 28, this triple valve being connected by a pipe 42 to the auxiliary reservoir 43, as usual. The stem 44 of the valve 37 extends upward and is adapted to be engaged by the chordal face of the oscillatory segment 45 mounted upon a shaft 46 and having an arm or handle 47, this being connected at its extremity by a link 48 to the segment 33. The upper portion of the chamber or cavity in the valve casing 35 above the valve 37 is formed with an exhaust port 49. The casing 35 is formed with a bracket 51 which is bolted to the upper part of the valve casing 10.

The ordinary engineer's brake valve of the automatic brake is illustrated in Figure 1 and designated 52. This is connected to the main reservoir 53, which main reservoir is connected by a pipe 54 to the chamber 11, as heretofore described. The engineer's brake valve 52 is connected to the train line 55 in the usual manner and is also connected to a pipe 56 extending to the triple valve 28. A pipe 57 connects the triple valve to the pipe 56.

It will be noted from Figure 3 that the stem 44 of the auxiliary valve 37 is longer than the stem of the valve 23, so that the upper end of stem 44 is a greater distance above the center of valve 45 than the valve stem of valve 23 is above the center of the valve 23 and thus assuming that the segments 33 and 45 are disposed at the same angle, a movement of the handle 17 to a released position will cause a movement of the valve 37 before the valve 23 is opened, and it will likewise be seen from Figure 3 that when the parts are in running position the valve 23 will be closed while the valve 37 will be partly open, but when the handle 17 is turned to its released position to open valve 23, the valve 37 will be opened to its full extent. When the handle 17 is turned to its holding position, the valve 37 and the valve 23 will both be closed, but the valve 14 will be slightly open, thus preventing any exhaust from the brake cylinders but permitting the pressure to be kept up in the brake cylinders. When the handle 17 is turned to its service or application position, it is obvious that the valve 14 will be fully opened so that full pressure is applied to the brakes, while, of course, the valves 23 and 37 will be fully closed.

The straight-air brake may be operated entirely independently of the automatic air brake or the automatic air brake controlled by the engineer's brake valve may be operated entirely independently of the straight-air brake. With this mechanism, the handle 17 may be shifted to four positions as indicated in the drawing, namely application or service, holding, running, and release. With this mechanism the engineer can hold the brakes on the engine and tender or tank after making application of the brakes by means of the engineer's automatic brake valve.

It will be seen that with this mechanism, valve 37 which controls flow from pipe 40 acts as a check valve when application of the brakes is made with the straight-air brake valve, and when the brakes are automatically applied by the engineer's brake 52, then the valve 23 acts as a check valve, and that to this extent these valves 23 and 37 act like the usual double check found in the Westinghouse and New York automatic air brake systems which include the engineer's automatic valve and the straight-air brake valve.

When in running position, handle 17 is disposed as illustrated in Figure 3, and in this position the valve 37 is opened while valve 23 is closed. If the engine and tank brakes are applied automatically with the engineer's automatic brake valve 52 in the usual manner and it be desired to release the engine and tank brakes without releasing the train brakes, then the handle 17 is moved to release position, which opens valve 23, allowing pressure within the brake cylinders 31 and 32 to escape through valve 23 and out through exhaust port 25, this operation occurring without releasing the train brake. If, on the other hand, it be desired to hold the engine and tank brakes and release the train brakes after an automatic application of the train brakes on the train and on the engine and tender, this can be secured by moving the handle 17 to its holding position, which closes valve 37, preventing the escape of brake cylinder pressure through valve 37, that is the brake cylinder pressure can pass through the exhaust to the triple valve 28 to pipe 40 but it cannot pass beyond this pipe 40 because the valve 37 is closed. A double quick release is secured for the brakes on the tender and engine when operating the straight-air brake valve by shifting the handle 17 to a fully released position. This opens both valves 23 and 37, allowing the air from brake cylinders 31 and 32 to escape both ways. This double quick release may also be used in releasing the automatic brake valve and shifting handle 17 to holding position opens valve 23 and valve 37 both, and the exhaust from the triple 28 goes through valve 37 also, while at the same time a double quick release is secured of the engine and tank brakes. This double quick release of the engine and tank brakes is not secured while the train brakes are holding after being set by the automatic brake mechanism, as the air then escapes through the valve 23 only when the handle 17 is turned to release position. It will be seen that this construction does away with the double check valves for the reason that it is connected to the exhaust port of the triple. It will likewise be seen that the tender brake cylinder 31 is connected in series with the driver brake cylinders and thus one triple operates the three brake cylinders. The straight-air brake valve can be operated independently of the automatic brake valve, and vice versa, when the handle 17 is in running position.

It is a particularly important feature of this invention that the two valves in the straight-air brake valve act as a double check valve when operating the brakes automatically and act as a double check when operating the straight-air brake, thus doing away with the necessity of the auxiliary reservoir and the triple valve and yet securing the same results. It will be understood, of course, that the train line pipe 55 has the usual hose and coupling connection at its rear end whereby the train line pipe of the tender is coupled to the next adjacent car.

While we have illustrated a construction which has been thoroughly effective in actual practice and which is particularly adapted to the Westinghouse air brake system, we do not wish to be limited to this, as it is obvious that many changes might be made in the details of construction and arrangement of parts without departing from the spirit of the invention.

We claim:—

1. An air brake system including a straight-air brake valve and a triple valve, the straight-air brake valve having an oscillatable handle, of an auxiliary valve casing having a valve seat, an inlet port at one end, an exhaust port at the other, the inlet port being connected to the exhaust port of the triple valve, a valve in said casing resiliently held against the seat and cutting off communication between the inlet port and the exhaust port, and means causing the opening of the auxiliary valve to establish communication between the exhaust port and the inlet port thereof when the straight-air brake valve is operated to establish communication between the brake cylinders and the exhaust port of the straight-air brake valve.

2. In a straight-air brake system, a straight-air brake valve, a triple valve, a pipe connecting the triple valve to the air delivery port of the straight-air brake valve, brake cylinders connected to said pipe, an auxiliary valve casing having an inlet port and an outlet port at its opposite ends, the inlet port being connected to the exhaust port of the triple valve, a valve in the valve casing yieldingly held in a closed position, and actuating means for opening said valve operatively connected to the actuating means of the straight-air brake valve to be operated coincidentally therewith and adapted to open said auxiliary valve when the exhaust valve of the straight-air brake valve is opened.

3. In a straight-air brake system, a straight-air brake valve, a triple valve, a pipe connecting the triple valve to the air delivery port of the straight-air brake valve, brake cylinders connected to said pipe, an auxiliary valve casing having an inlet port and an outlet port at its opposite ends, the inlet port being connected to the exhaust port of the triple valve, a valve in the valve casing yieldingly held in a closed position, and actuating means for opening said valve operatively connected to the actuating means of the straight-air brake valve to be operated coincidentally therewith and adapted to open said auxiliary valve when the exhaust valve of the straight-air brake valve is opened and adapted to open the auxiliary valve when the straight-air brake valve is in its running position and to open the auxiliary valve to its full extent when the straight-air brake valve is in its released position.

4. In a straight-air brake system, a straight-air brake valve, a triple valve, a pipe connecting the triple valve to the air delivery port of the straight-air brake valve, brake cylinders connected to said pipe, an auxiliary valve casing having an inlet port and an outlet port at its opposite ends, the inlet port being connected to the exhaust port of the triple valve, a valve in the valve casing yieldingly held in a closed position, actuating means for said auxiliary valve comprising an oscillatable segment adapted when shifted in one direction to shift the auxiliary valve from its seat and when shifted in the other direction to permit the auxiliary valve to engage its seat under the action of said spring, an arm operatively connected to the segment, and means operatively connecting said arm to the handle of the straight-air brake valve and adapted to cause the rotation of said segment to a position to open the valve when the straight-air brake valve is in its running position.

5. In an air brake system, the combination with a main reservoir, an auxiliary reservoir, and a triple valve, air brake cylinders adapted to be connected by the triple valve to the auxiliary reservoir, means for actuating the triple valve, of a straight-air brake valve including an application valve, exhaust valve, manually operable means shiftable in one direction to open the application valve and close the exhaust valve to thereby establish communication between the main reservoir and the brake cylinders and in the other direction to close the application valve and open the exhaust valve to thereby permit the exhaustion of air from the brake cylinders, an auxiliary valve casing having an exhaust port at one end and connected at its other end to the exhaust port of the triple valve and having a valve seat between said ports, a resiliently closed valve coacting with the valve seat, and means for causing said valve to open to thereby establish communication between the triple valve and the exhaust port of the auxiliary valve casing when the actuating mechanism of the straight-air brake valve has been shifted to a running position and cause the further opening of the auxiliary valve when the exhaust valve of the straight-air brake valve has been opened by a shifting of the actuating mechanism to the released position.

6. An air brake system including a straight-air brake valve and a triple valve, an auxiliary valve casing having a valve seat, an inlet port at one end, an exhaust port at the other, the inlet port being connected to the exhaust port of the triple valve, a valve in said casing yieldingly held against the seat and cutting off communication between the inlet port and the exhaust port, and means causing the opening of the auxiliary valve to establish communication between the exhaust port and the inlet port thereof when the straight-air brake valve is operated to establish communication between the brake cylinders and the exhaust port of the straight-air brake valve.

7. In an air brake system of an engine and tender, the combination with a main reservoir, brake cylinders for the engine and tender, an automatic engineer's brake valve and a straight-air brake valve, both connected to the main reservoir, a single auxiliary reservoir, a single triple valve associated therewith, an operative connection between the straight-air brake valve and the brake cylinders of the engine and tender and with said triple, of an auxiliary valve casing having a valve seat, an inlet port at one end, an exhaust port at the other, the inlet port being connected to the exhaust port of the triple valve, a valve in the casing resiliently held against the seat and cutting off communication between the inlet port and the exhaust port, and means causing the opening of the auxiliary valve to establish communication between the exhaust port and the inlet port thereof when the straight-air brake valve is operated to establish communication between the brake cylinders and the exhaust port of the straight-air brake valve, the exhaust port of the auxiliary valve being connected to the exhaust port of the triple valve, the valves in the straight-air brake valve casing and the auxiliary valve casing acting as double check valves.

In testimony whereof we hereunto affix our signatures.

J. W. FINCH.
WILLIAM A. TALLEY.